US012567706B2

(12) United States Patent
Sun et al.

(10) Patent No.: US 12,567,706 B2
(45) Date of Patent: Mar. 3, 2026

(54) FAN ELECTRICAL CONNECTION STRUCTURE

(71) Applicant: ASIA VITAL COMPONENTS CO., LTD., New Taipei City (TW)

(72) Inventors: Sung-Wei Sun, New Taipei City (TW); Feng Liu, New Taipei City (TW); Zizhuo Li, New Taipei City (TW)

(73) Assignee: ASIA VITAL COMPONENTS CO., LTD., New Taipei City (TW)

( * ) Notice: Subject to any disclaimer, the term of this patent is extended or adjusted under 35 U.S.C. 154(b) by 439 days.

(21) Appl. No.: 18/058,736

(22) Filed: Nov. 24, 2022

(65) Prior Publication Data

US 2023/0327381 A1 Oct. 12, 2023

(30) Foreign Application Priority Data

Apr. 6, 2022 (TW) ................................ 111113095

(51) Int. Cl.
*H01R 13/73* (2006.01)
*F04D 25/06* (2006.01)
*F04D 29/40* (2006.01)

(52) U.S. Cl.
CPC ............ *H01R 13/73* (2013.01); *F04D 25/06* (2013.01); *F04D 29/40* (2013.01)

(58) Field of Classification Search
CPC ................................................ H01R 13/405
See application file for complete search history.

(56) References Cited

U.S. PATENT DOCUMENTS 5,616,975 A * 4/1997 May et al. ............ H02K 5/225 310/71
6,034,871 A * 3/2000 Cheng .................... G06F 1/203 165/104.34
6,375,440 B2 * 4/2002 Kosugi ................ F04D 25/166 416/247 R (Continued)

FOREIGN PATENT DOCUMENTS

CN 217036056 U 7/2022
JP 2021156244 A 10/2021

(Continued)

OTHER PUBLICATIONS

Search Report dated Nov. 1, 2022 issued by Taiwan Intellectual Property Office for counterpart application No. 111113095.

(Continued)

*Primary Examiner* — Renee S Luebke
(74) *Attorney, Agent, or Firm* — Bradley J. Thorson; DeWitt LLP

(57) ABSTRACT

A fan electrical connection structure includes a fan having a fan frame, which has a circuit board and an electrical connection section provided therein. The electrical connection section includes a plurality of metal terminals and is extended in a direction parallel to an air flow passage defined in the fan frame. The metal terminals respectively have an end electrically connected to the circuit board and another end extended into the electrical connection section. With the above arrangements, parts for electrical connection in the fan are simplified and can be easily connected or disconnected by a user with only one hand.

3 Claims, 3 Drawing Sheets

(56) References Cited

U.S. PATENT DOCUMENTS

| | | | | |
|---|---|---|---|---|
| 6,999,313 | B2 * | 2/2006 | Shih | H05K 7/20172 165/104.33 |
| 10,522,925 | B2 * | 12/2019 | Sypolt et al. | H01R 12/7064 |
| 2008/0261439 | A1 * | 10/2008 | Chen | H01R 13/512 439/485 |
| 2019/0021185 | A1 * | 1/2019 | Ju | H01R 13/502 |
| 2021/0120699 | A1 * | 4/2021 | Lim | F04D 25/0693 |
| 2023/0327381 | A1 * | 10/2023 | Sun | F04D 29/522 |
| 2023/0400891 | A1 * | 12/2023 | Lee | H01R 13/5208 |

FOREIGN PATENT DOCUMENTS

| | | | |
|---|---|---|---|
| TW | 200829128 | A | 7/2008 |
| TW | M620263 | U | 11/2021 |
| TW | M621121 | | 12/2021 |
| TW | M629615 | U | 7/2022 |

OTHER PUBLICATIONS

Search Report dated Nov. 10, 2023 issued by Taiwan Intellectual Property Office for counterpart application No. 111113095.

Search Report dated Jul. 24, 2025, issued by China National Intellectual Property Administration for counterpart application No. 202210359218.0, 2 pages.

* cited by examiner

FAN ELECTRICAL CONNECTION STRUCTURE

This application claims the priority benefit of Taiwan patent application number 111113095 filed on Apr. 6, 2022.

FIELD OF THE INVENTION

The present invention relates to a fan electrical connection structure, and more particularly, to a fan electrical connection structure that simplifies the electrical connection of a fan.

BACKGROUND OF THE INVENTION

A fan is a common system heat dissipation device used in an electronic apparatus or a vehicle engine bay to provide the effect of forced cooling. Generally, the fan is electrically connected to a motherboard of the electronic apparatus or the vehicle to get required power supply and signal feed control thereof.

Please refer to FIG. 1, which shows a conventional fan 1. As shown, the fan 1 includes an electrically conducting wire 11 serially connected to a male or a female connector 2 for electrically connecting to another mating connector 3 provided on a motherboard of an electronic apparatus or a vehicle, so as to get required power supply or signal transmission. The electrically conducting wire 11 is flexible, and the connector 2 dangles from an end of the electrically conducting wire 11. To electrically connect the fan 1 to the motherboard of the electronic apparatus or the vehicle, a user must connect the two connectors 2, 3 together with his bare hands and then hold the two connected conductors 2, 3 on a U-shaped fixing structure 12 located at one side of a frame of the fan 1, so that the two conductors 2, 3 are held in place and prevented from shaking or vibrating. To disconnect the two conductors 2, 3 from each other, the user must also remove the connected connectors 2, 3 from the U-shaped fixing structure 12 and then disconnect them from each other with two bare hands. Even though the two connected connectors 2, 3 are held on the U-shaped fixing structure 12, the electrically conducting wire 11 is still subject to dangling and causes disorder on the motherboard. Further, it is pretty difficult to connect or disconnect the two connectors 2, 3 to or from each other with bare hands in a narrow space.

It is therefore an important thing to solve the problems in the conventional fan 1, including the connection and disconnection of the connectors to and from each other with bare hands and the lack of good wire hiding or wire organizing.

SUMMARY OF THE INVENTION

To effectively solve the above problems, a primary object of the present invention is to provide a fan electrical connection structure, which simplifies the electrical connection between a plurality of metal terminals and a circuit board of the fan.

To achieve the above and other objects, the fan electrical connection structure according to the present invention includes a fan.

The fan includes a fan frame, which has a circuit board and an electrical connection section provided therein. The electrical connection section is located parallel to an air flow passage defined in the fan frame and has a plurality of metal terminals provided therein. And, the metal terminals respectively have an end electrically connected to the circuit board and another end extended into the electrical connection section.

With the fan electrical connection structure of the present invention, the electrical connection structure in a fan is simplified and a user can connect or disconnect connectors in a narrow space with only one hand. Further, with the present invention, fan manufacturing procedures are simplified and fan mold manufacturing cost is reduced.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
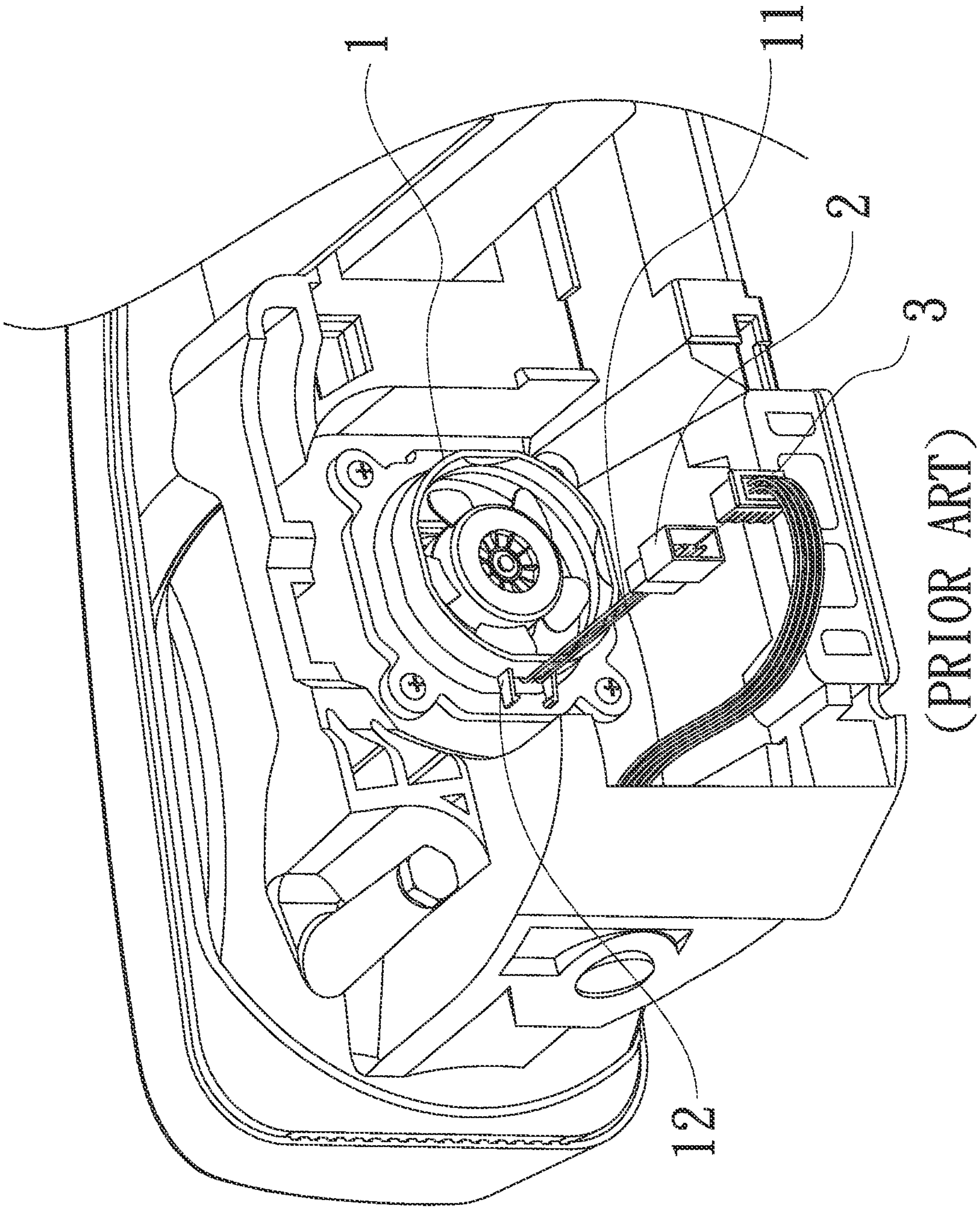
(PRIOR ART) Fig. 1
FIG. 1 is a perspective view of a conventional fan.

The present invention will now be described with some preferred embodiments thereof. For the purpose of easy to understand, elements that are the same in the preferred embodiments are denoted by the same reference numerals.

Figure 2:
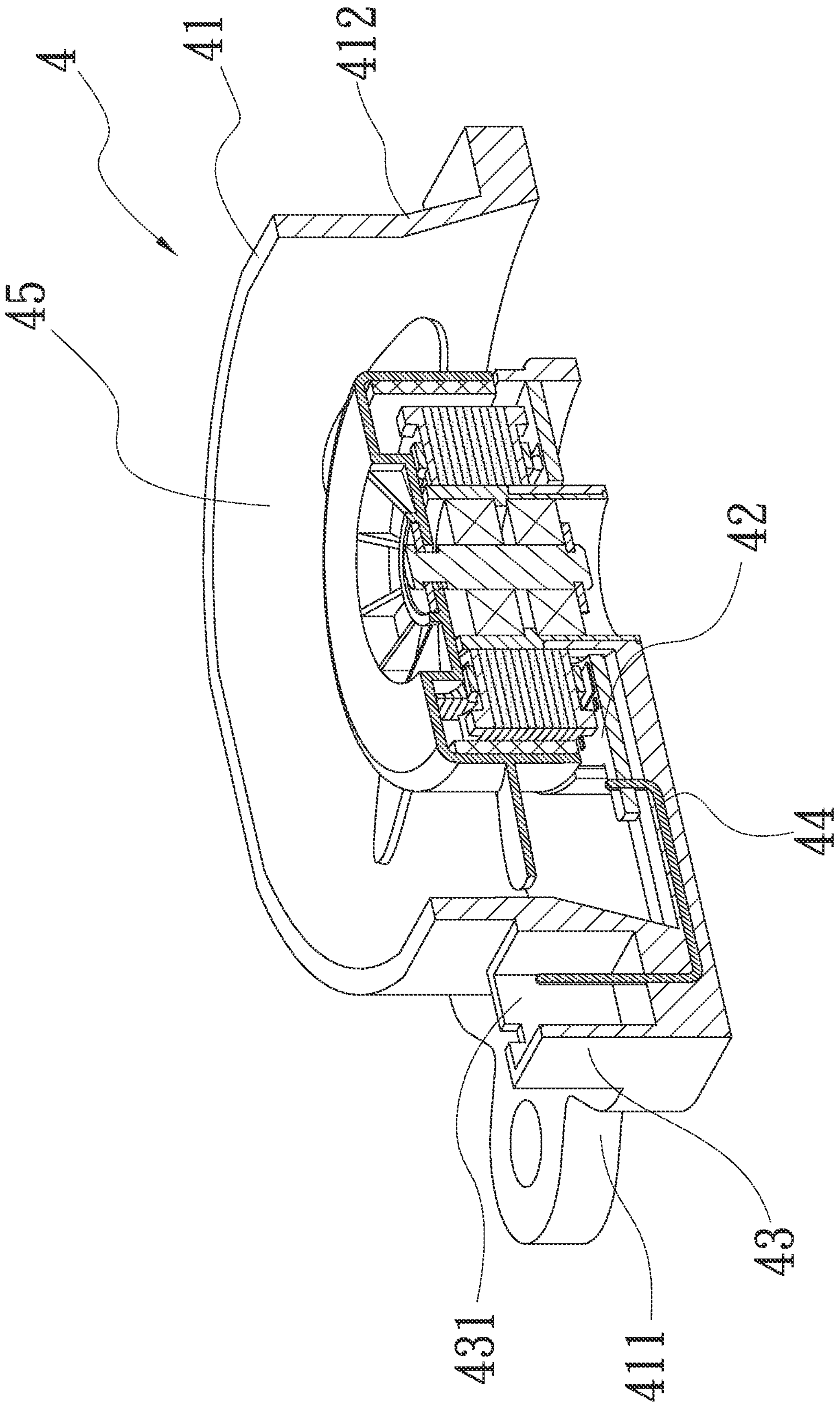
FIG. 2 is a cutaway view of a fan electrical connection structure according to a first embodiment of the present invention.

Please refer to FIG. 2, which is a cutaway view of a fan electrical connection structure according to a first embodiment of the present invention. As shown, the fan electrical connection structure includes a fan 4.

The fan 4 includes a fan frame 41 provided with a circuit board 42 and an electrical connection section 43. The electrical connection section 43 is located parallel to an air flow passage 45 defined in the fan frame 41. The electrical connection section 43 includes a plurality of metal terminals 44, each of which has an end electrically connected to the circuit board 42 and another end extended into the electrical connection section 43.

The fan frame 41 includes a base 411 and a sidewall 412. The sidewall 412 is vertically extended from the base 411. The electrical connection section 43 can be configured as a male connector plug, or a female connector receptacle. In the first embodiment of the present invention, the electrical connection section 43 is illustrated as a female connector receptacle. More specifically, the electrical connection section 43 is upward extended from the base 411 in a direction parallel to the sidewall 412. The electrical connection section 43 internally defines a recess 431 having an open top side, which is located perpendicular to the sidewall 412. The metal terminals 44 respectively have one end located in the recess 431.

In another alternative embodiment (not shown), the electrical connection section 43 is sideward extended from the sidewall 412 in a direction parallel to the base 411. In the alternative embodiment, the electrical connection section 43 internally defines a recess 431 having an open lateral side, which is located perpendicular to the base 411, and the metal terminals 44 respectively have one end located in the recess 431.

In the first embodiment of the present invention, the electrical connection section 43 is illustrated as being upward extended from the base 411. However, it is understood the illustrated electrical connection section 43 is non-restrictive.

Figure 3:
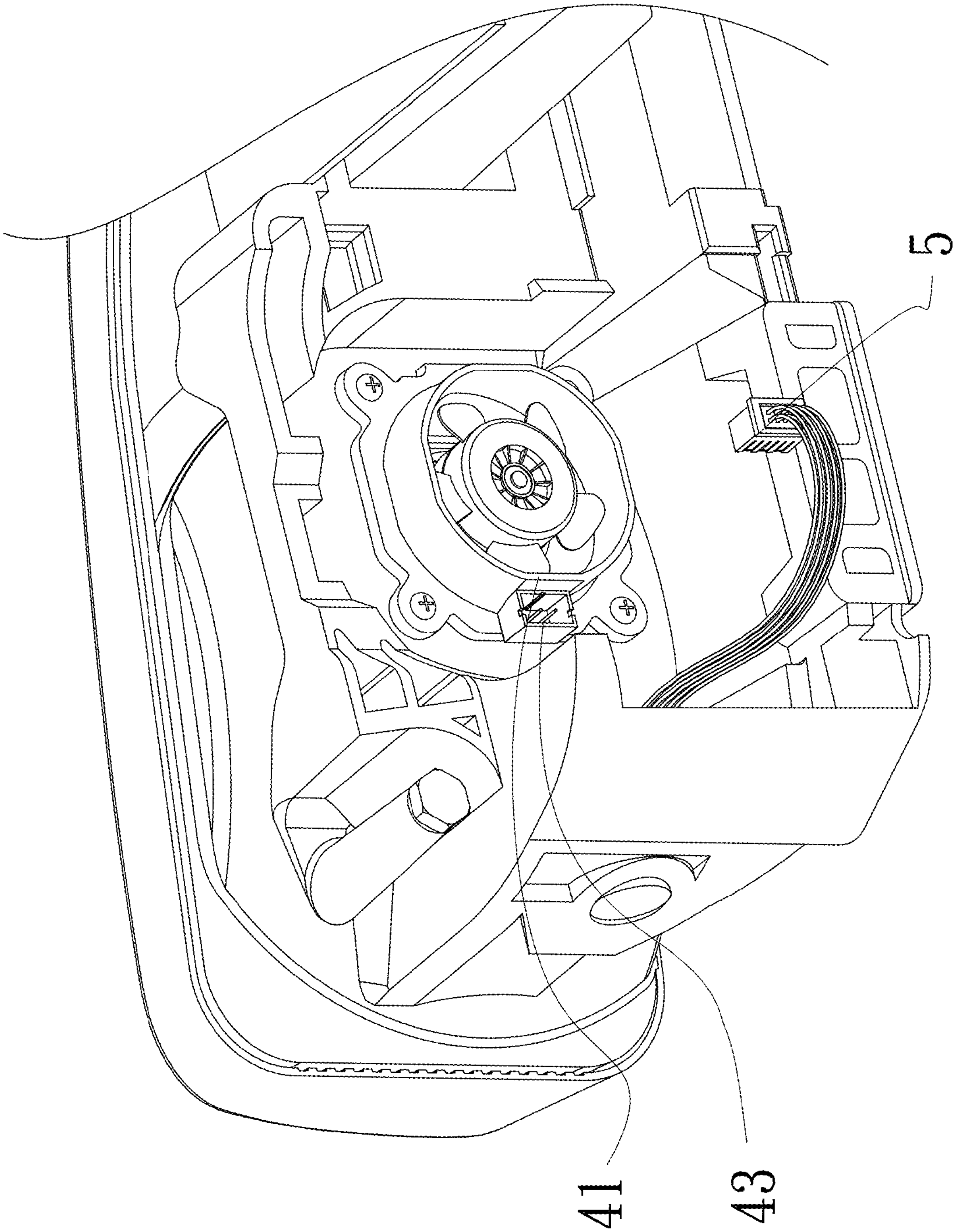
FIG. 3 is a perspective view of the fan electrical connection structure according to the present invention.

Please refer to FIG. 3, which is a perspective view of the fan electrical connection structure according to the present invention. As shown, in all the above mentioned embodiments, there is a stator and a rotor provided in the fan frame 41. Since the stator and the rotor are structurally the same as those in conventional fans, they are not repeatedly described herein.

In the above described embodiments, the metal terminals 44 are metal electrical conductors formed by stamping. No matter the electrical connection section 43 in the fan frame 41 is in the form of a receptacle (i.e. a female connector) or a plug (i.e. a male connector), it is designed mainly to enable easy provision of the metal terminals 44 in the electrical connection section 43 and allow a user to conveniently handle an electrical connection of the electrical connection section 43 to another mating connector 5 (a male or a female connector) at another location with only one hand.

The present invention provides the following advantages: the metal terminals 44 are integrally formed with the fan frame 41 by overmolding to thereby save the space required for electrically conducting wires and eliminate the inconvenience in wire pulling caused by annoying wiring; the electrical connection section 43 provides a structure for direct electrical connection to another connector; and the metal terminals 44 respectively have one end connected to the circuit board 42 of the fan 4 and another end extended into the electrical connection section 43 to serve as a bridge for the electrical connection between the circuit board 42 in the fan frame 41 and the motherboard of an electronic device using the fan 4. In brief, the present invention enables the user to electrically connect or disconnect two connectors in a narrow space with only one hand and accordingly, eliminates the wiring problems in the conventional way of electrical connecting the connector to the circuit board.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A fan structure, comprising:

a fan including a fan frame, which has a circuit board and an electrical connection section provided therein; the fan frame defining an air flow passage having an air outlet, the electrical connection section being located parallel to the air flow passage such that air discharged from the air outlet does not impinge on the electrical connection section, the electrical connection section having a plurality of metal terminals provided therein; and the metal terminals respectively having an end electrically connected to the circuit board and another end extended into the electrical connection section, wherein the fan frame includes a sidewall and a base, the sidewall extending vertically from the base, the electrical connection section extending upwardly from the base in a direction parallel to the sidewall and internally defining a recess having an open top side perpendicular to the sidewall, and the metal terminals respectively having one end located in the recess, wherein the metal terminals and the fan frame are integrally formed by overmolding, and wherein the circuit board, the electrical connection section and the fan frame are molded together.

2. The fan structure as claimed in claim 1, wherein the electrical connection section is configured as a female connector receptacle.

3. The fan structure as claimed in claim 1, wherein the metal terminals are metal electrical conductors formed by stamping.

* * * * *